(12) United States Patent
Zhang et al.

(10) Patent No.: US 11,805,875 B1
(45) Date of Patent: Nov. 7, 2023

(54) DEGRADABLE CASE FOR PACKAGING FALSE EYELASHES

(71) Applicant: Qingdao Futesen Plastic Technology Co., Ltd, Qingdao (CN)

(72) Inventors: Zhaozhong Zhang, Qingdao (CN); Kexiu Li, Qingdao (CN)

(73) Assignee: Qingdao Futesen Plastic Technology Co., Ltd, Qingdao (CN)

( * ) Notice: Subject to any disclaimer, the term of this patent is extended or adjusted under 35 U.S.C. 154(b) by 0 days.

(21) Appl. No.: 18/150,786

(22) Filed: Jan. 5, 2023

(30) Foreign Application Priority Data

Nov. 11, 2022 (CN) .......................... 202223007343.X

(51) Int. Cl.
*A45C 11/24* (2006.01)
*A45C 13/02* (2006.01)

(52) U.S. Cl.
CPC .............. *A45C 11/24* (2013.01); *A45C 13/02* (2013.01); *A45C 2013/026* (2013.01)

(58) Field of Classification Search
CPC .... A45C 11/24; A45C 13/02; A45C 2013/026
See application file for complete search history.

(56) References Cited

U.S. PATENT DOCUMENTS

| | | | | |
|---|---|---|---|---|
| 2,604,961 A | * | 7/1952 | Koch | A45C 13/008 190/28 |
| 2,775,048 A | * | 12/1956 | Berman | G09F 7/04 40/620 |
| 2,835,259 A | * | 5/1958 | Goodman | A41G 5/02 D28/99 |
| 3,369,585 A | * | 2/1968 | Martinsen | A45C 11/182 150/147 |
| 3,822,495 A | * | 7/1974 | Ohfuji | G03B 21/64 40/772 |
| 3,886,683 A | * | 6/1975 | Hudgin | A01G 13/0275 47/9 |
| 4,037,716 A | * | 7/1977 | Marks | A45C 11/326 206/37.1 |
| 4,300,610 A | * | 11/1981 | China | A45C 11/326 206/37 |

(Continued)

FOREIGN PATENT DOCUMENTS

CN 208036975 U 11/2018
CN 216735518 U 6/2022

*Primary Examiner* — Tri M Mai

(57) ABSTRACT

A degradable case for packaging false eyelashes includes a case body, a case cover, an expandable placement bracket and a placement plate. One side of the case body is rotatably connected with the case cover through a spring hinge, and the expandable placement bracket is arranged in an internal cavity of the case body; the expandable placement bracket comprises inserting frames matched and slidably inserted with the placement plate; elastic reeds are arranged between every two inserting frames, and the placement plate is provided with an adhesive tape for bonding false eyelash bodies. In the present invention, the expandable placement bracket is arranged in the case body to fix the placement plate. After the case cover is opened, the expandable placement bracket is used for driving the placement plate to expand, so as to smoothly take the false eyelashes on the placement plate.

3 Claims, 3 Drawing Sheets

(56) References Cited

U.S. PATENT DOCUMENTS

2003/0037851 A1* 2/2003 Hogganvik .......... A45C 11/182
　　　　　　　　　　　　　　　　　　　150/147
2005/0263420 A1* 12/2005 Oommen ........... A61B 10/0096
　　　　　　　　　　　　　　　　　　　206/438

* cited by examiner

DEGRADABLE CASE FOR PACKAGING FALSE EYELASHES

CROSS REFERENCE TO RELATED APPLICATIONS

This application claims foreign priority of Chinese Patent Application No. 202223007343.X, filed on Nov. 11, 2022 in the China National Intellectual Property Administration, the disclosures of all of which are hereby incorporated by reference.

TECHNICAL FIELD

The present invention relates to the technical field of cosmetic products, in particular to a degradable case for packaging false eyelashes.

BACKGROUND OF THE PRESENT INVENTION

With the development of economy, the material life of people has been greatly satisfied, and the natural love of beauty of women has been fully reflected. In facial dressing, most of women pursue long and thick eyelashes, so false eyelashes are indispensable. The false eyelashes are usually put into a storage box. The existing storage box for the false eyelashes has a simple structure and much unused internal space. A placement cardboard (or plastic board) for placing the false eyelashes is arranged in a case body, and the false eyelashes are temporarily fixed by metal nails (small rubber nails), which is inconvenient for the operation of taking the false eyelashes. There is also a false eyelash packaging box which is a blister box to shape the false eyelashes. It has small number of packaging, wastes the space, and is made of plastic hard to be degraded, without environmental protection.

SUMMARY OF PRESENT INVENTION

(I) Technical Problems to be Solved

In view of the shortcomings of the prior art, the present invention provides a degradable case for packaging false eyelashes, which solves the problems that the false eyelashes are temporarily fixed by metal nails (small rubber nails), which is inconvenient for the operation of taking the false eyelashes; a blister box is used to shape the false eyelashes, which has small number of packaging, wastes the space, and is made of plastic hard to be degraded, without environmental protection.

(II) Technical Solution

In order to realize the above purpose, the present invention specifically adopts the following technical solution:

A degradable case for packaging false eyelashes comprises a case body, a case cover, an expandable placement bracket and a placement plate; one side of the case body is rotatably connected with the case cover through a spring hinge, and the expandable placement bracket is arranged in an internal cavity of the case body; the expandable placement bracket comprises inserting frames matched and slidably inserted with the placement plate; elastic reeds are arranged between every two inserting frames, and the placement plate is provided with an adhesive tape for bonding false eyelash bodies; and the case body, the case cover and the placement plate are degradable materials.

Further, the inserting frames are provided with inserting slots matched and inserted with the placement plate, and connecting ears arranged integrally on the inserting frames are rotatably connected to a rotating shaft; the rotating shaft is fixedly connected to the inner wall of the case body through a shaft seat; and one end of the elastic reed on the lowest inserting frame is fixedly connected to the bottom inner wall of the case body, and the other end is fixedly connected to the inserting frame.

Further, the placement plate is provided with a perforating bonding groove in a position where the adhesive tape is placed; the false eyelash bodies are bonded on the adhesive tape at the bonding groove, and the length of the bonding groove is less than the length of the false eyelash bodies; and the false eyelash bodies at both ends of the bonding groove are upturned, and the bonding groove is rectangular or circular arc-shaped.

Further, the inner part of the case cover is provided with collision blocks at the corresponding inserting frames; a soft rubber sealing ring is arranged at the port edge of the case cover; and the case body and the case cover are degradable materials.

(III) Beneficial Effects

Compared with the prior art, the present invention provides a degradable case for packaging false eyelashes, which has the following beneficial effects:

In the present invention, the expandable placement bracket is arranged in the case body to fix the placement plate. After the case cover is opened, the expandable placement bracket is used for driving the placement plate to expand, so as to smoothly take the false eyelashes on the placement plate. At the same time, the false eyelashes are bonded to the placement plate, and two ends of the false eyelashes are not bonded, which is convenient to quickly take the false eyelashes. The whole is light and delicate, and convenient to carry and use. Moreover, the case body, the case cover and the placement plate are all made of degradable materials which can degrade after being discarded, so as to realize green, environmental protection and convenient use.

In the figures: 1. case body; 2. case cover; 201. collision block; 3. expandable placement bracket; 301. inserting frame; 3011. inserting slot; 302. elastic reed; 303. rotating shaft; 304. shaft seat; 4. placement plate; 401. adhesive tape; 5. false eyelash body.

DETAILED DESCRIPTION OF PREFERRED EMBODIMENTS

The technical solutions in the embodiments of the present invention will be clearly and fully described below in combination with the drawings in the embodiments of the present invention. Apparently, the described embodiments are merely part of the embodiments of the present invention, not all of the embodiments. Based on the embodiments in the present invention, all other embodiments obtained by those ordinary skilled in the art without contributing creative labor will belong to the protection scope of the present invention.

EMBODIMENTS

Figure 1:
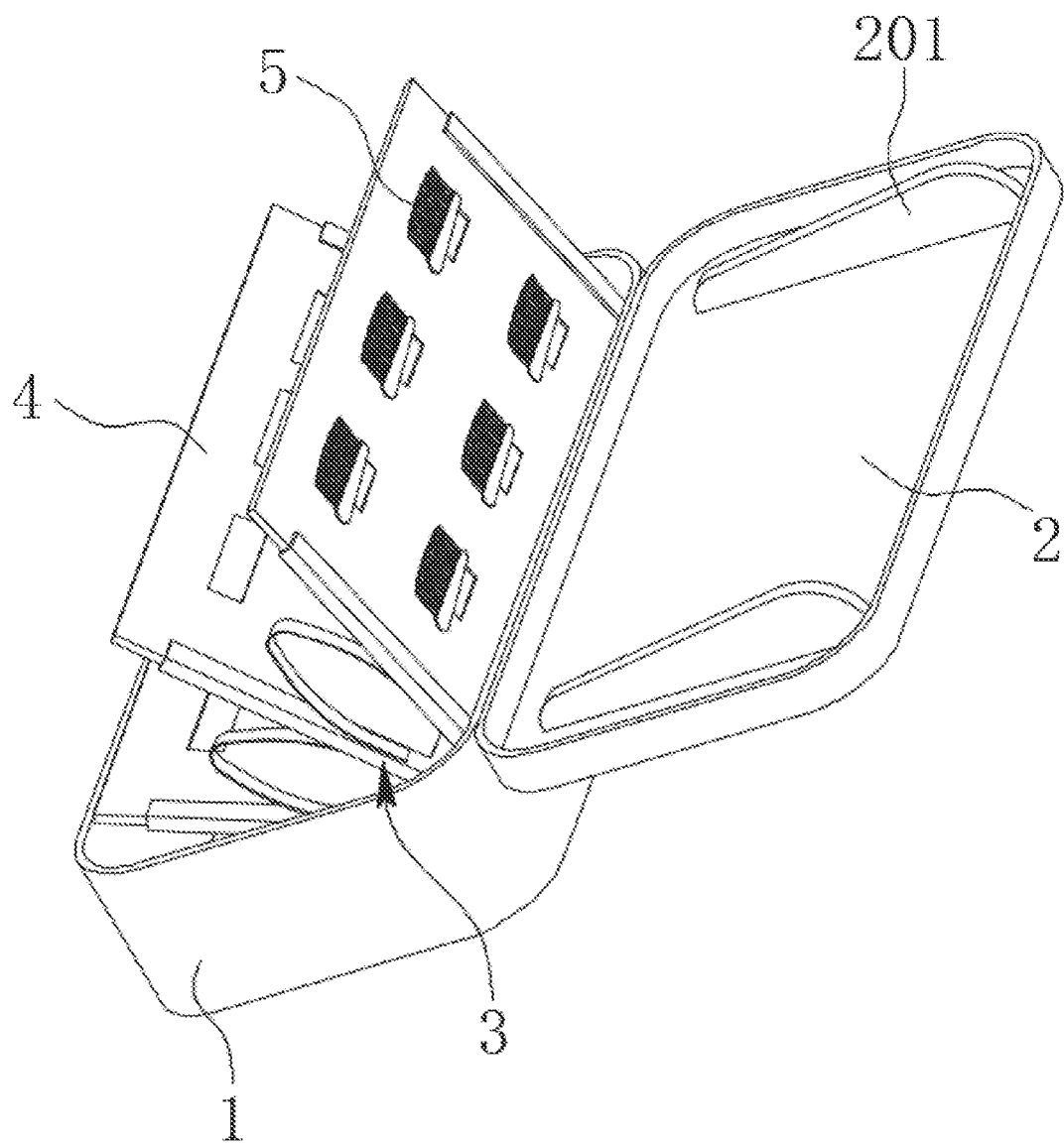
FIG. 1 is a structural schematic diagram of the present invention.
Figure 2:
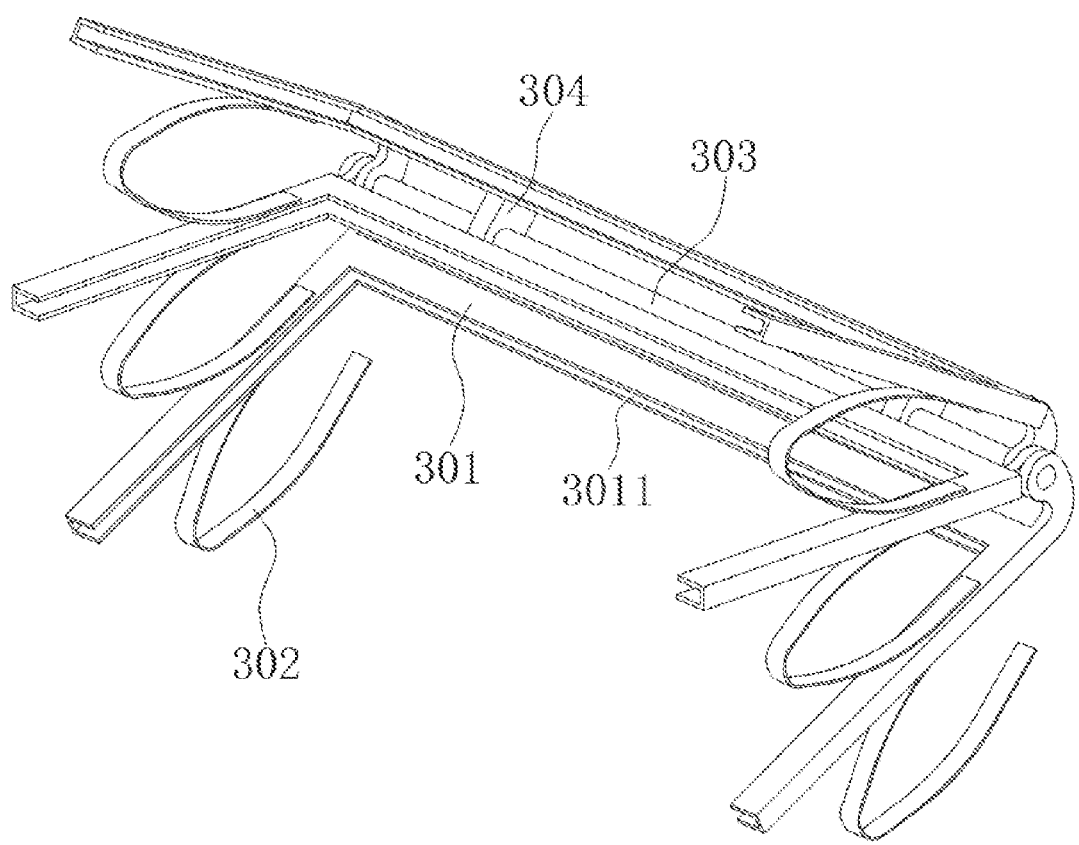
FIG. 2 is a structural schematic diagram of an expandable placement bracket in the present invention.
Figure 3:
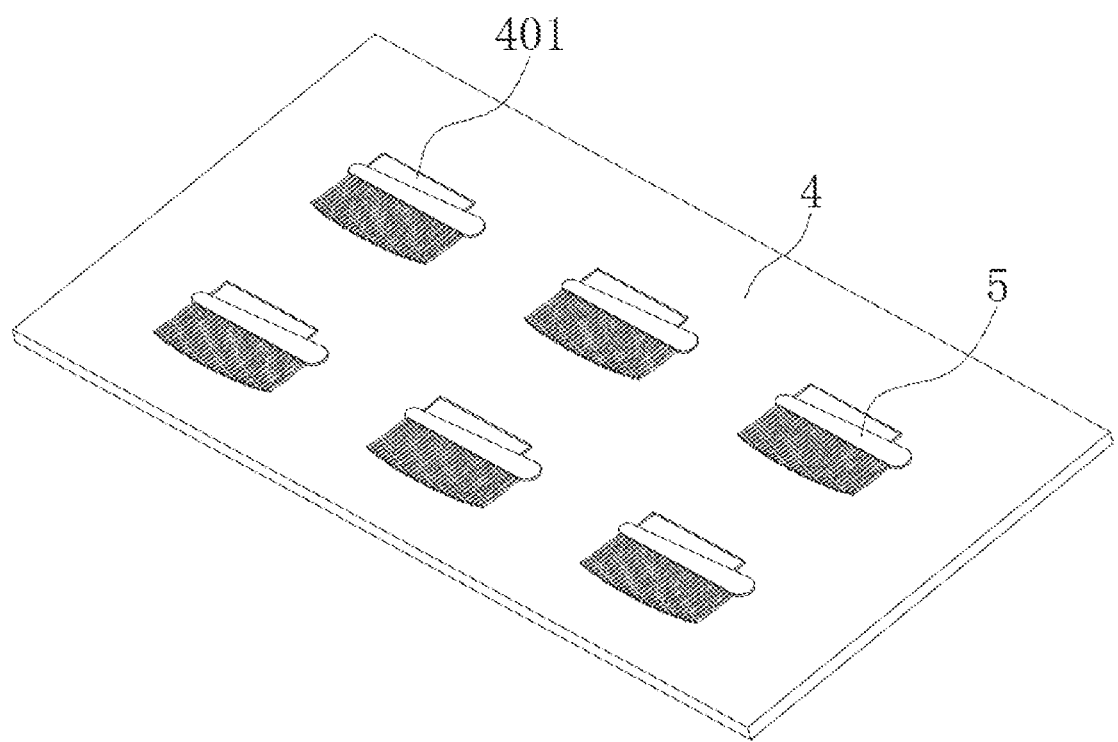
FIG. 3 is a structural schematic diagram of a placement plate and false eyelash bodies in the present invention.

As shown in FIG. 1, FIG. 2 and FIG. 3, an embodiment of the present invention proposes a degradable case for packaging false eyelashes, which comprises a case body 1, a case cover 2, an expandable placement bracket 3 and a placement plate 4. One side of the case body 1 is rotatably connected with the case cover 2 through a spring hinge to ensure that the case cover 2 can rotate smoothly on the case body 1, so as to smoothly open and close the case cover 2 and ensure smooth use. The expandable placement bracket 3 is arranged in an internal cavity of the case body 1; the expandable placement bracket 3 is used for installing the placement plate 4 in the case body 1 stably. At the same time, when the case cover 2 is opened in the process of use, the expandable placement bracket 3 is expanded, so that the placement plate 4 is pushed out from the cavity of the case body 1 to facilitate a user to smoothly take and place the false eyelashes bonded on the placement plate 4 and improve the convenience of use. The expandable placement bracket 3 comprises inserting frames 301 matched and slidably inserted with the placement plate 4 to ensure that the placement plate 4 can be quickly disassembled and assembled on the inserting frames 301 to smoothly take down the placement plate 4 for conducting the operation of taking the false eyelashes in the process of use. Elastic reeds 302 are arranged between every two inserting frames 301, and the elastic reeds 302 are used to provide a push force for expanding the inserting frames 301 to ensure smooth expansion. At the same time, the expandable placement bracket 3 is compressed when folded and stored, so as to facilitate the subsequent opening of the case cover 2. The elastic reeds 302 restore to original shapes and drive the inserting frames 301 to expand. Moreover, the placement plate 4 is provided with an adhesive tape 401 for bonding false eyelashes bodies 5, and the false eyelashes are stably fixed on the placement plate 4 to stably store the false eyelashes. The case body 1, the case cover 2 and the placement plate 4 are all biodegradable materials. The biodegradable materials are the existing known disclosed technical means. This application document does not protect the materials, and does not elaborate the materials too much. The biodegradable materials are used to facilitate subsequent degradation and protect the environment.

As shown in FIG. 1 and FIG. 2, in some embodiments, the inserting frames 301 are provided with inserting slots 3011 matched and inserted with the placement plate 4 to ensure that the placement plate 4 can be smoothly placed on the inserting frames 301 to realize the stable connection between the two and ensure the stable storage of the false eyelashes. Connecting ears arranged integrally on the inserting frames 301 are rotatably connected to a rotating shaft 303; the rotating shaft 303 is fixedly connected to the inner wall of the case body 1 through a shaft seat 304; the inserting frames 301 are stably installed in the internal cavity of case body 1 by using the shaft seat 304 and the rotating shaft 303, and can smoothly rotate on the rotating shaft 303 in the process of use to realize the expansion and folding storage operation of the whole expandable placement bracket 3. One end of the elastic reed 302 on the lowest inserting frame 301 is fixedly connected to the bottom inner wall of the case body 1, and the other end is fixedly connected to the inserting frame 301. The elastic reeds 302 are used for stretching the inserting frames 301 under the action of the elastic force after the case cover 2 is opened, so as to realize the expansion operation of the whole expandable placement bracket 3.

As shown in FIG. 3, in some embodiments, the placement plate 4 is provided with a perforating bonding groove in a position where the adhesive tape 401 is placed; the false eyelash bodies 5 are bonded on the adhesive tape 401 at the bonding groove; the bonding groove is convenient to expose part of a bonding surface of the adhesive tape 401 to stably bond the false eyelashes on the placement plate 4 and ensure that the false eyelashes are stably stored in the case body 1. The length of the bonding groove is less than the length of the false eyelash bodies 5; and the false eyelash bodies 5 at both ends of the bonding groove are upturned, and the bonding groove is rectangular or circular arc-shaped. Two ends of the false eyelash bodies 5 extend to two ends of the bonding groove and are upturned, which is convenient for the user to remove the false eyelash bodies 5 directly from the bonding groove by hands to ensure convenient taking and use.

As shown in FIG. 1, in some embodiments, collision blocks 201 are arranged inside the case cover 2 at corresponding inserting frames 301, and the collision blocks 201 arranged on the case cover 2 are used for colliding with the top inserting frame 301 in the closing process of the case cover 2 to ensure that the inserting frames 301 are gradually pushed into case body 1 in the closing process of the case cover 2 and ensure that the inserting frames 301 and the placement plate 4 thereon are stably stored in the case body 1 to achieve stable storage in order to effectively protect and store the false eyelashes. A soft rubber sealing ring is arranged at the port edge of the case cover 2 to ensure that a gap at a connecting part between the case cover 2 and the case body 1 is blocked to prevent dust from entering the case body 1 during storage.

Finally, it should be noted that the above only describes preferred embodiments of the present invention, and is not intended to limit the present invention. Although the present invention is described in detail with reference to the above embodiments, those skilled in the art may still modify the technical solutions recorded in the above embodiments, or equivalently replace some of the technical features. Any modification, equivalent replacement, improvement, etc. made within the spirit and the principle of the present invention shall be included within the protection scope of the present invention.

We claim:

1. A degradable case for packaging false eyelashes, comprising a case body (1), a case cover (2), an expandable placement bracket (3) and a placement plate (4), wherein one side of the case body (1) is rotatably connected with the case cover (2), and the expandable placement bracket (3) is arranged in an internal cavity of the case body (1); the expandable placement bracket (3) comprises inserting frames (301) matched and slidably inserted with the placement plate (4); elastic reeds (302) are arranged between every two inserting frames (301), and the placement plate (4) is provided with an adhesive tape (401) for bonding false eyelash bodies (5); and the case body (1), the case cover (2) and the placement plate (4) are degradable materials wherein the inserting frames (301) are provided with inserting slots (3011) matched and inserted with the placement plate (4), and connecting ears arranged integrally on the inserting frames (301) are rotatably connected to a rotating shaft (303); the rotating shaft (303) is fixedly connected to the inner wall of the case body (1) through a shaft seat (304); and one end of the elastic reed (302) on the lowest inserting frame (301) is fixedly connected to the bottom inner wall of the case body (1), and the other end is fixedly connected to the inserting frame (301).

2. The degradable case for packaging false eyelashes according to claim 1, wherein the placement plate (4) is provided with a perforating bonding groove in a position where the adhesive tape (401) is placed; the false eyelash bodies (5) are bonded on the adhesive tape (401) at the bonding groove, and the length of the bonding groove is less than the length of the false eyelash bodies (5); and the false eyelash bodies (5) at both ends of the bonding groove are upturned, and the bonding groove is rectangular or circular arc-shaped.

3. The degradable case for packaging false eyelashes according to claim 1, wherein the inner part of the case cover (2) is provided with collision blocks (201) at the corresponding inserting frames (301); and a soft rubber sealing ring is arranged at the port edge of the case cover (2).

\* \* \* \* \*